G. B. WALKER.
ARMORED MOTOR TRUCK.
APPLICATION FILED FEB. 13, 1918.
1,319,194. Patented Oct. 21, 1919.
2 SHEETS—SHEET 1.
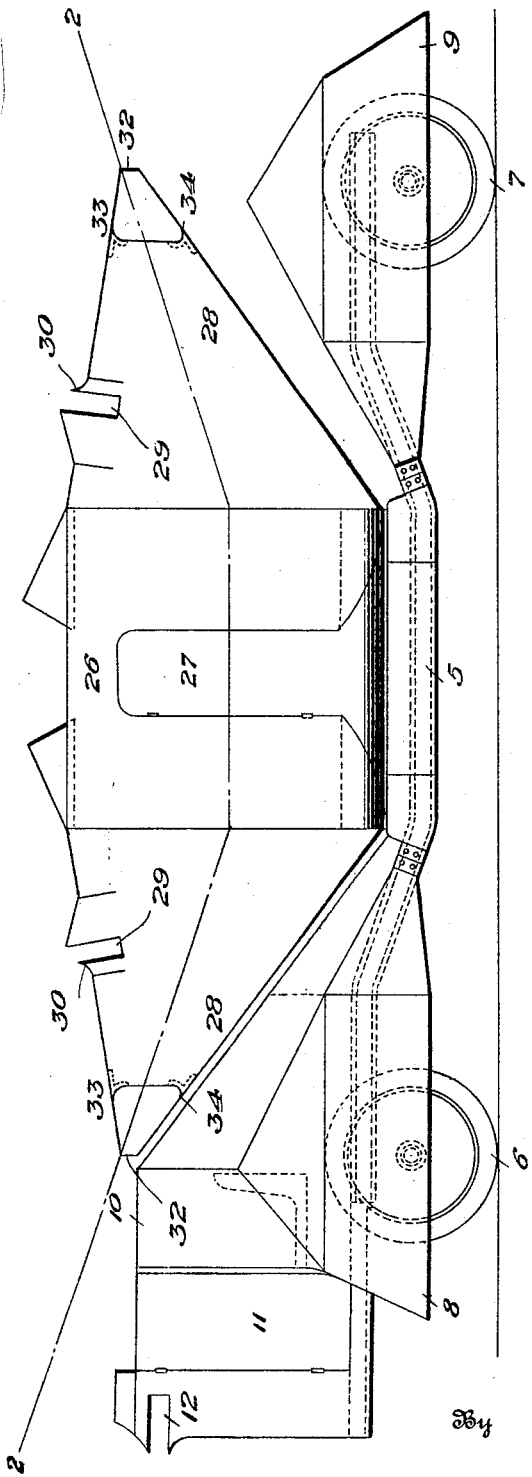
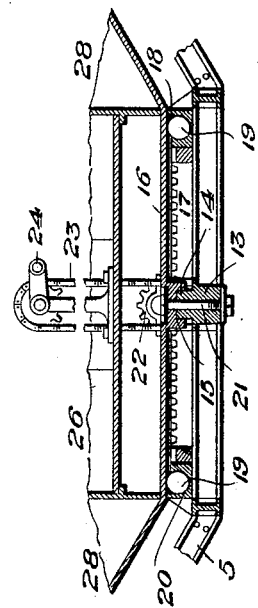
Inventor
George B. Walker
By David Peeler Moore
Attorney

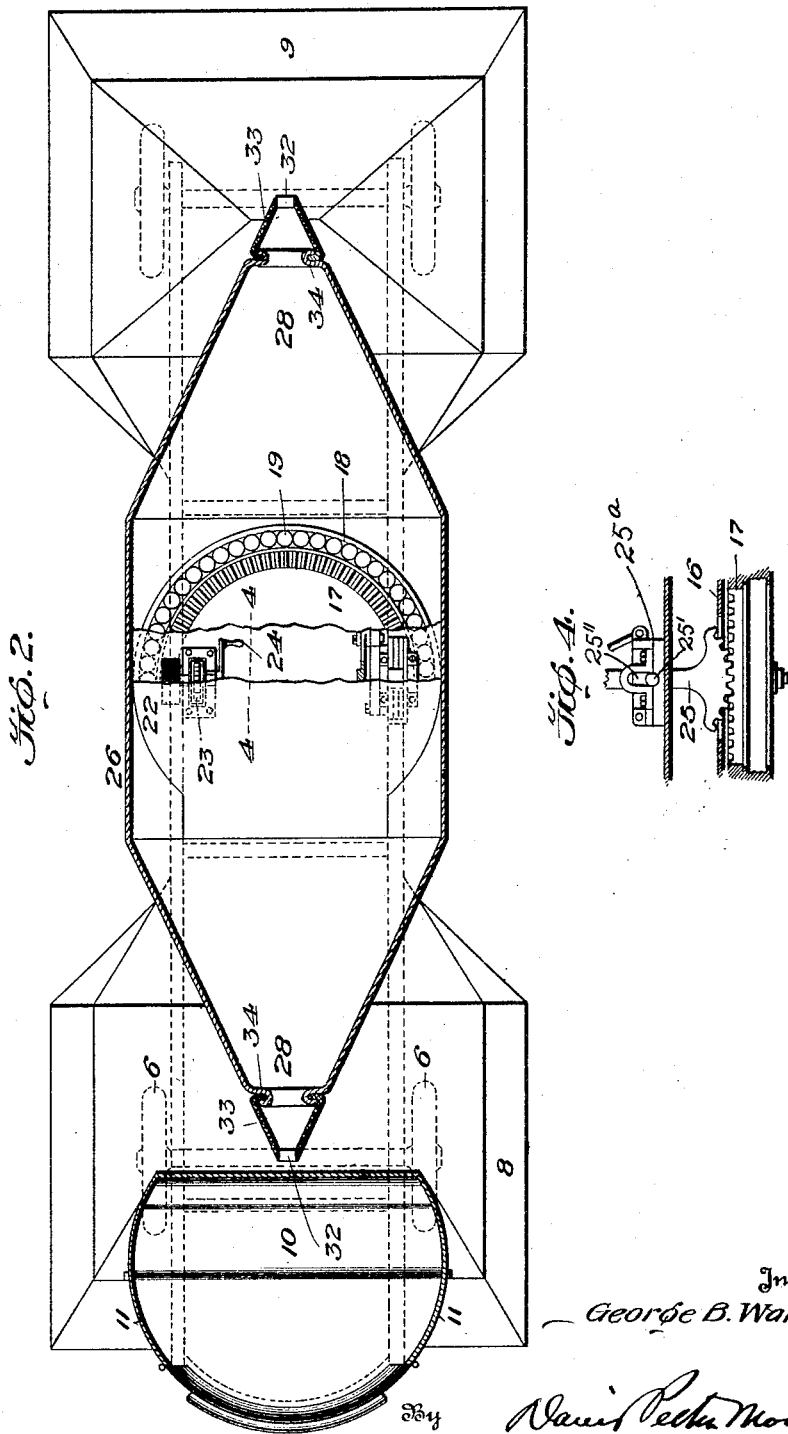

UNITED STATES PATENT OFFICE.

GEORGE B. WALKER, OF LANCASTER, PENNSYLVANIA, ASSIGNOR OF ONE-HALF TO THOS. D. WAUGAMAN, OF LEMOYNE, PENNSYLVANIA.

ARMORED MOTOR-TRUCK.

1,319,194.  Specification of Letters Patent.  Patented Oct. 21, 1919.

Application filed February 13, 1918. Serial No. 216,908.

*To all whom it may concern:*

Be it known that I, GEORGE B. WALKER, a citizen of the United States, residing at Lancaster, in the county of Lancaster and State of Pennsylvania, have invented certain new and useful Improvements in Armored Motor-Trucks, of which the following is a specification, reference being had therein to the accompanying drawings.

This invention relates to improvements in armored motor trucks, more particularly to a type of truck especially designed for machine gun use, one object of the invention being the provision of a novel turret arrangement by means of which several oppositely disposed machine guns may be operated singly or jointly and from various positions relative to the chassis.

A further object of this invention is the provision of a turret arrangement made of such peculiar arrangements, construction and formation as to provide deflecting surfaces for bullets or projectiles so that the occupants of the turret are protected at all times during the conflict.

A still further object of this invention is the provision of a truck of this character which is simple, durable and inexpensive in construction and thoroughly practical and efficient in use.

In the accompanying drawings:

Figure 1 is a side elevation of the complete truck.

Fig. 2 is a section taken on line 2—2 of Fig. 1.

Fig. 3 is an enlarged detail section view showing the mechanism for rotating the turret.

Fig. 4 is a section taken on line 4—4 of Fig. 2.

Referring to the drawings, the numeral 5 designates the frame or chassis which is provided with front steering wheels 6 and the rear traction wheels 7 and supports the fixed shields 8 and 9. Mounted in the front portion of the truck, above the shield 8, is the armored protected casement 10 for the driver, having a door 11 and the sight opening 12.

Connected between the chassis frame 5 is a transverse bar 13 which in turn carries a cylindrical projection 14, fitting in the socket 15 of the circular plate 16. The underside of the plate 16 is provided with a ball race 18 for receiving the balls 19 carried by the circular ball race 20, the latter of which is mounted upon the chassis. In order to lock the member 16 upon the beam 13 and down upon the ball bearing, a bolt 21 is employed.

Fixedly connected to the ball race 20 is a stationary gear 17 which is in mesh at all times with the gear 22, which is operated by means of the sprocket and chain 23, and the handle 24 so that the plate 16 may be rotated. This means is provided to impart said movement to the plate 16 and consequently the mechanism carried thereby but in use it is desired to provide a means whereby the plate 16 and its carried mechanism may be moved quickly in either direction, it being only for a short distance. In this event the segment 25 which has its pin 25' mounted in the elongated slot 25" of the bearing 25ª, is provided, the same when out of use being elevated so that the segment 25 does not enmesh with the gear 17 but when in use is lowered and placed in engagement and operated from within the member 26 to impart the necessary quick movement to such member 26 as above referred to. By this means slight forward and reverse rotation may be imparted so as to bring the various ends of the member 26 in proper firing position.

The plate 16 is a part of the cylindrical member 26, of the turret of the present device, the same being provided with a door 27 and with the oppositely disposed frusto-conical ends 28. Each of these frusto-conical ends 28, is provided with a sight opening 29, the lower edge 30 of which is flared oppositely to form a deflector, while the upper edge is also projected as illustrated.

Although not shown, it is intended that two machine guns be mounted in this turret, one in each member 28 with its barrel pointing toward the opening 32 of the movable end 33, which by means of the universal joint 34 and the material from which it is made permits a certain gyratory or oscillatory movement, so that the gun may be pointed at various angles, while with the device shown in Fig. 4, the complete turret may be oscillated to give a sweeping effect to the discharging gun.

From the foregoing description, it is evident that with a turret provided with frusto-conical ends and with a cylindrical connecting body, that the greatest amount of deflecting surface possible is provided, so that the occupants are protected at all times against small projectiles or bullets.

What I claim as new is:

1. An armored truck, including a chassis and a turret mounted thereon for rotation, said turret comprising a central horizontally disposed cylindrical portion and two oppositely disposed frusto-conical gun casements extending from the ends thereof.

2. An armored truck, including a chassis and a turret mounted thereon for rotation, said turret comprising a central horizontally disposed cylindrical portion and two oppositely disposed frusto-conical gun-casements, each of said casements being provided with a gyratory outer end apertured to permit of the passage therethrough of bullets.

3. An armored truck, including a chassis and a turret mounted thereon for rotation, said turret comprising a central horizontally disposed cylindrical portion and two oppositely disposed frusto-conical gun casements, means for rotating the turret, and means for imparting limited forward and reverse movement to the turret.

4. An armored truck including a chassis and a turret mounted thereon for rotation, said turret including a horizontally disposed cylindrical portion, two substantially frusto-conical hollow members, the bases of which are connected in communication with the opposite ends of the cylindrical portion, a stationary gear carried by the chassis, a pinion mounted in the cylindrical portion and enmeshing with the segmental gear, manually controlled means for operating the pinion to rotate the turret, a tooth segment mounted for swinging and sliding movement mounted in the cylindrical portion and adapted to be moved into and out of engagement with the segmental gear, and means for imparting oscillatory movement thereto whereby forward or reverse rotation for a limited distance is imparted to the turret.

In testimony whereof I affix my signature.

GEORGE B. WALKER.

Copies of this patent may be obtained for five cents each, by addressing the "Commissioner of Patents, Washington, D. C."